United States Patent
Hu et al.

(10) Patent No.: US 8,077,557 B1
(45) Date of Patent: Dec. 13, 2011

(54) MULTIPLE APERTURE VCSEL EAMR HEADS

(75) Inventors: Yufeng Hu, Fremont, CA (US); Ruolin Li, Milpitas, CA (US); Ut Tran, San Jose, CA (US); Jinshan Li, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 288 days.

(21) Appl. No.: 12/468,813

(22) Filed: May 19, 2009

(51) Int. Cl.
*G11B 11/05* (2006.01)
(52) U.S. Cl. ............ 369/13.24; 369/13.33; 369/112.09; 385/12; 385/88; 385/89
(58) Field of Classification Search ............... 369/13.24, 369/13.33, 13.32, 112.09, 112.14, 112.21, 369/112.27, 121, 300; 385/129–133, 12, 385/88–89, 92, 94, 114–118
See application file for complete search history.

(56) References Cited

U.S. PATENT DOCUMENTS

| | | | |
|---|---|---|---|
| 5,831,960 A | 11/1998 | Jiang et al. | |
| 6,023,450 A | 2/2000 | Park et al. | |
| 6,795,630 B2 * | 9/2004 | Challener et al. | 385/129 |
| 6,807,131 B1 | 10/2004 | Hesselink et al. | |
| 6,834,027 B1 | 12/2004 | Sakaguchi et al. | |
| 7,069,569 B2 | 6/2006 | Thornton et al. | |
| 7,158,470 B2 | 1/2007 | Thornton et al. | |
| 7,310,206 B2 | 12/2007 | Liu et al. | |
| 2008/0056073 A1 * | 3/2008 | Shimizu | 369/13.02 |
| 2008/0316872 A1 * | 12/2008 | Shimizu et al. | 369/13.24 |

FOREIGN PATENT DOCUMENTS

WO 2007/133036 A1 11/2007

* cited by examiner

*Primary Examiner* — Hoa T Nguyen
*Assistant Examiner* — Andrew Sasinowski

(57) ABSTRACT

A magnetic recording device comprises a multi-aperture vertical cavity surface emitting laser (VCSEL) operably coupled to a magnetic recording head and a plurality of waveguides disposed in the magnetic recording head. Each of the plurality of waveguides has a first end coupled to a different aperture of the multi-aperture VCSEL. The magnetic recording device further comprises a near field transducer disposed in the magnetic recording head. Each of the plurality of waveguides has a second end coupled to the near field transducer.

21 Claims, 7 Drawing Sheets

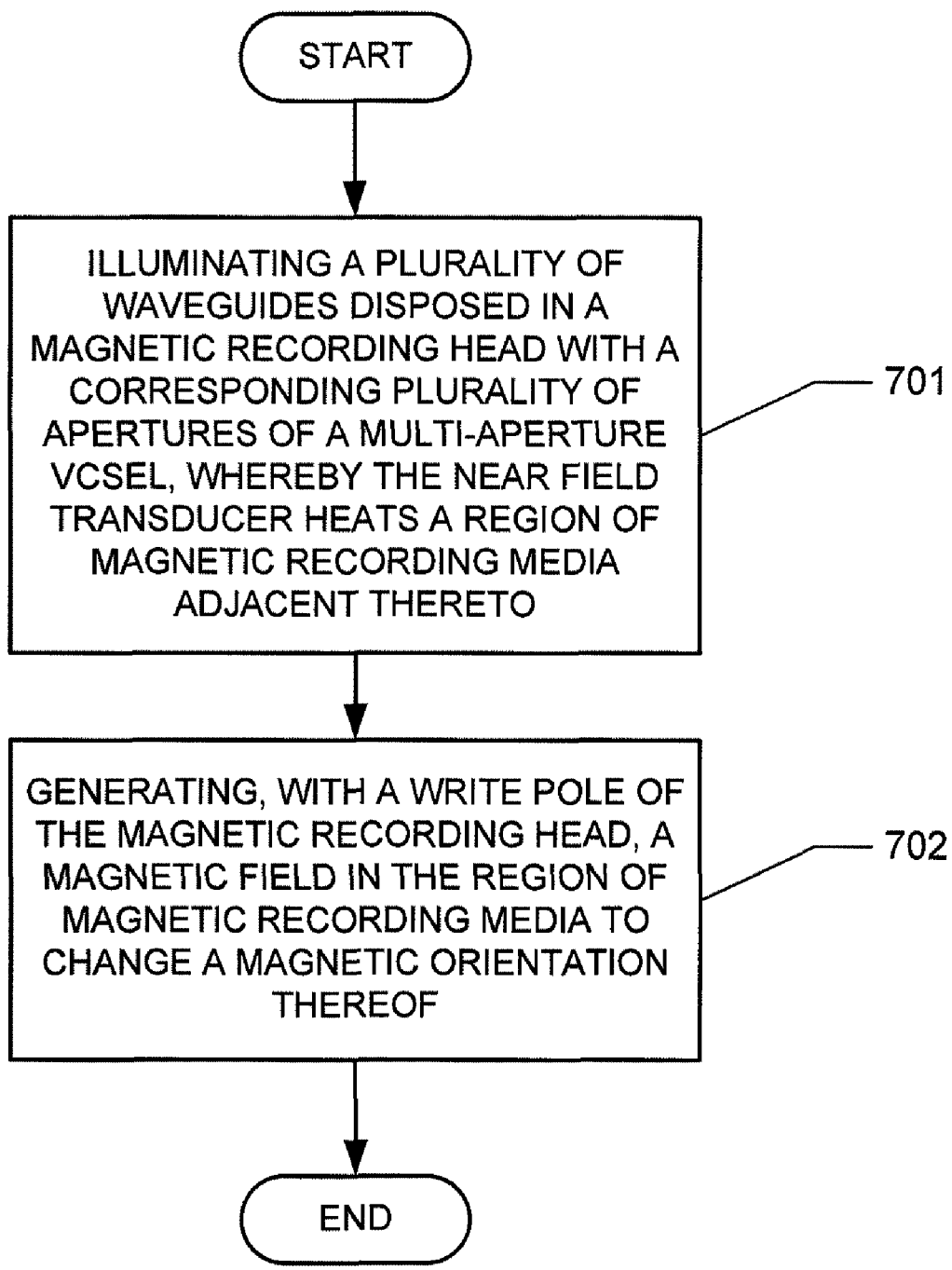

MULTIPLE APERTURE VCSEL EAMR HEADS

FIELD OF THE INVENTION

The present invention generally relates to hard disk drives and, in particular, relates to energy assisted magnetic recording heads with multiple aperture vertical cavity surface emitting lasers.

BACKGROUND OF THE INVENTION

To increase the areal storage density of a magnetic recording device, the recording layer thereof may be provided with smaller and smaller individual magnetic grains. This reduction in grain size soon reaches a "superparamagnetic limit," at which point the magnetic grains become thermally unstable and incapable of maintaining their magnetization. The thermal stability of the magnetic grains can be increased by increasing the magnetic anisotropy thereof (e.g., by utilizing materials with higher anisotropic constants). Increasing the magnetic anisotropy of the magnetic grains, however, increases their coercivity and therefore requires a stronger magnetic field to change the magnetic orientation of the grains (e.g., in a write operation).

Energy assisted magnetic recording (EAMR) is used to address this challenge. In an EAMR system, a small spot where data is to be written is locally heated to reduce the coercivity of the magnetic grains therein for the duration of the write operation, thereby allowing materials with increased magnetic anisotropy to be used, and greater areal storage density to be exploited.

One approach to providing heat in an EAMR involves using edge-emitting lasers to direct laser light through the magnetic recording head to the magnetic media. Integrating edge-emitting lasers into a magnetic recording head, however, presents a number of technological difficulties. Vertical cavity surface emitting lasers (VCSELs) can be more easily integrated into magnetic recording heads, but a single VCSEL may not provide enough optical energy to the magnetic recording media to overcome the increased coercivity thereof, and integrating multiple VCSEL dies into a magnetic recording head would be prohibitively difficult.

SUMMARY OF THE INVENTION

Various embodiments of the present invention solve the foregoing problems by providing magnetic recording devices with multiple-aperture VCSELs capable of providing more optical power than single aperture VCSELs. The multiple-aperture VCSELs illuminate near field transducers in the magnetic recording heads, whereby localized regions of magnetic recording media are heated to reduce the coercivity thereof.

According to one embodiment of the subject disclosure, a magnetic recording device comprises a multi-aperture vertical cavity surface emitting laser (VCSEL) operably coupled to a magnetic recording head and a plurality of waveguides disposed in the magnetic recording head. Each of the plurality of waveguides has a first end coupled to a different aperture of the multi-aperture VCSEL. The magnetic recording device further comprises a near field transducer disposed in the magnetic recording head. Each of the plurality of waveguides has a second end coupled to the near field transducer.

According to another embodiment of the subject disclosure, a method of using a magnetic recording device comprises the step of illuminating a plurality of waveguides disposed in a magnetic recording head with a corresponding plurality of apertures of a multi-aperture vertical cavity surface emitting laser (VCSEL). Each of the plurality of waveguides has a second end coupled to a near field transducer of the magnetic recording head, whereby the near field transducer heats a region of magnetic recording media adjacent thereto. The method further comprises the step of generating, with a write pole of the magnetic recording head, a magnetic field in the region of magnetic recording media to change a magnetic orientation thereof.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 7 is a flow chart illustrating a method of using a magnetic recording device in accordance with one aspect of the subject disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

A vertical cavity surface emitting laser (VCSEL) is a type of semiconductor laser diode in which the laser light is emitted out-of-plane (e.g., from either a top or bottom surface thereof), as opposed to conventional in-plane semiconductor lasers which emit laser light from their edge surfaces (after being cleaved out of the wafer in which they are fabricated). Because VCSELs can emit laser light from the top or bottom surface of the chip in which they are embedded, a wafer containing VCSELs can be aligned with and bonded to a wafer containing magnetic recording heads before the wafers are diced into individual devices. After the wafers are aligned and bonded face to face or back to face, they can then be thinned and interconnected prior to additional stacking processes or dicing.

VCSELs enjoy a number of advantages over edge-emitting lasers, especially when implemented in an energy assisted magnetic recording (EAMR) system. For example, the wavelength stability and uniformity of a VCSEL, together with its relative insensitivity to temperature, ensure that the EAMR head can operate at maximum efficiency without experiencing wavelength drift. In this regard, during operation, the temperature inside a hard disk drive is around 60° C., and the temperature on the magnetic head where the laser is attached would be a little higher during writing operations. As a VCSEL can operate reliably up to 80° C. or higher, an EAMR hard drive employing the VCSEL will enjoy reliability, and can be simply designed, as no cooling system will be required for the VCSEL.

Figure 1:
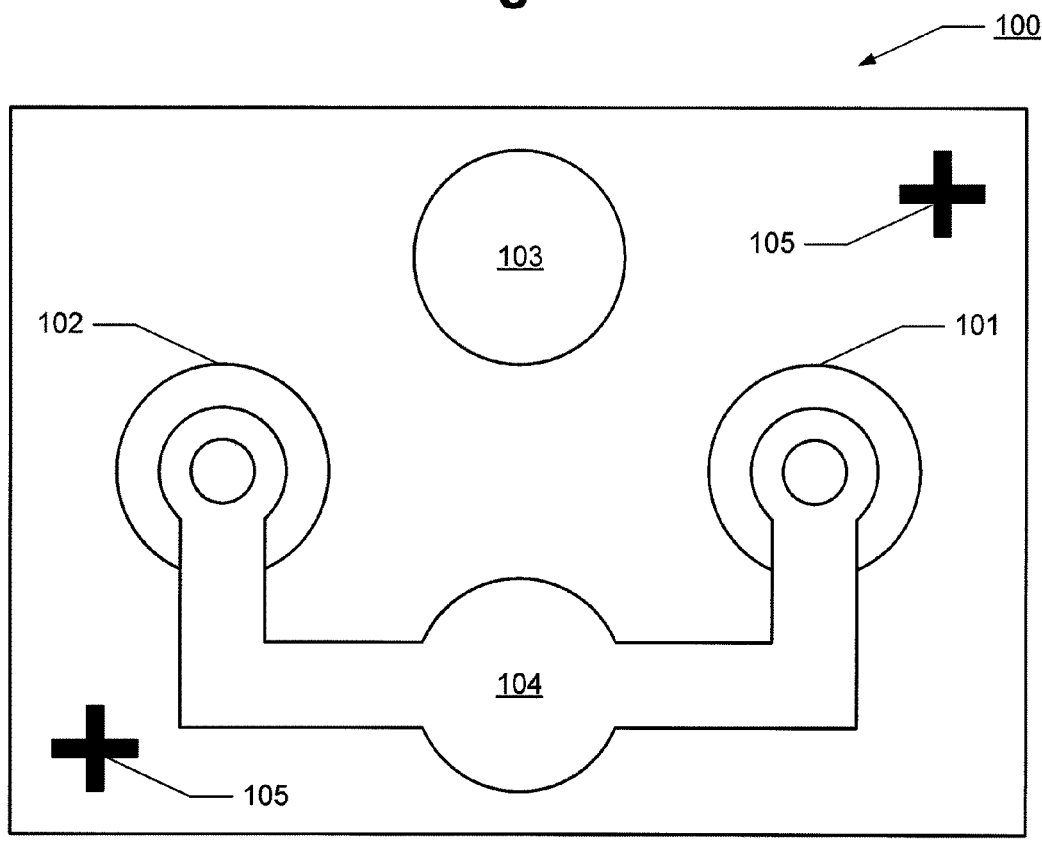
FIG. 1 illustrates a multiple aperture vertical cavity surface emitting laser (VCSEL) in accordance with one aspect of the subject disclosure.

FIG. 1 illustrates a multiple aperture VCSEL 100 in accordance with one aspect of the subject disclosure. VCSEL 100 includes two apertures (i.e. laser cavities) 101 and 102 disposed on the front distributed Bragg reflector (DBR) layer of VCSEL 100. The apertures 101 and 102 share the same multiple-layer mirror structure and bottom DBR mirror layer, such that the power of VCSEL 100 is twice the power of a similarly-sized VCSEL 100 with a single aperture. Apertures 101 and 102 share bonding pads 103 and 104, such that both apertures are on the same circuit. VCSEL 100 further includes alignment marks 105, which may be used to help align VCSEL 100 with another device to which it may be attached by, e.g., wafer-level bonding.

VCSEL 100 is symmetric, inasmuch as apertures 101 and 102 are similarly sized, shaped, and oriented. Accordingly, the power provided by each of apertures 101 and 102 is substantially the same, and the polarization of the light emitted thereby may be the same as well. This symmetric configuration may be used when VCSEL 100 is to be coupled to a symmetric waveguide or fiber assembly in a magnetic recording head. According to other aspects of the subject disclosure, however, asymmetric VCSELs may be provided, such that the power and/or polarization of the light emitted by different apertures thereof may be different.

Figure 2:
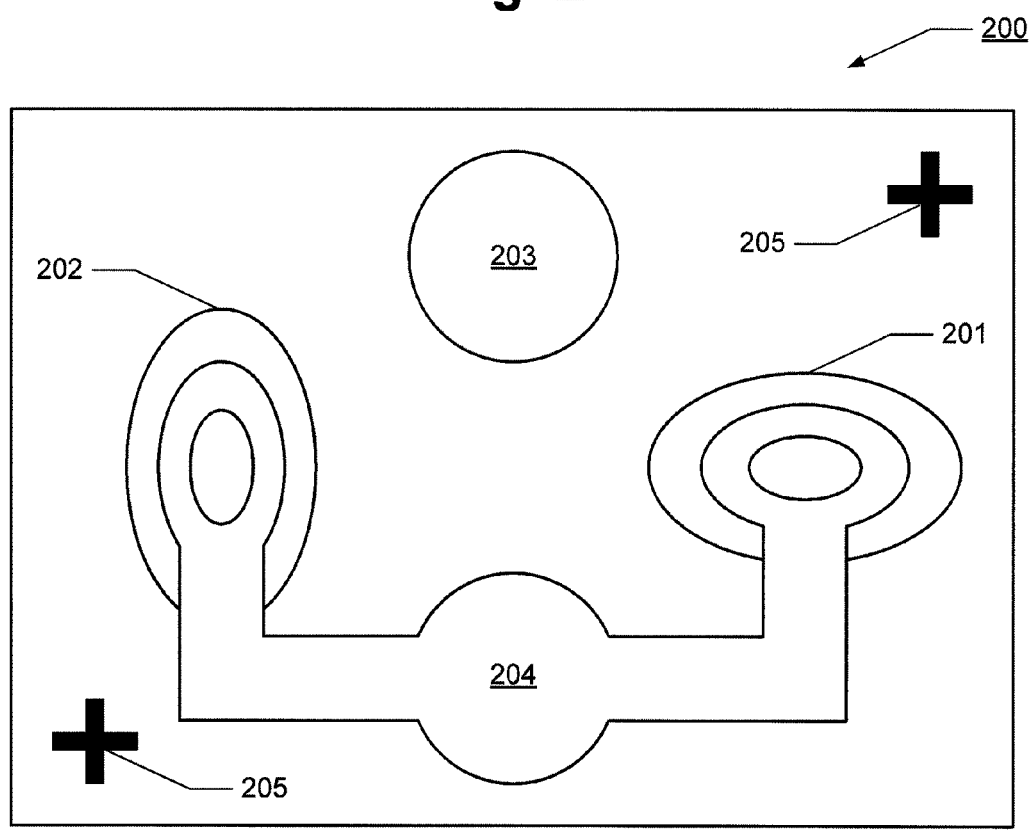
FIG. 2 illustrates a multiple aperture VCSEL in accordance with one aspect of the subject disclosure.

For example, FIG. 2 illustrates a multiple aperture VCSEL 200 in accordance with another aspect of the subject disclosure. VCSEL 200 includes two similarly-sized and shaped apertures 201 and 202, which are oriented at 90° to one another. The elliptical shape of apertures 201 and 202 may be chosen to maximize a desired linear or circular polarization of the light produced thereby, to optimize the coupling of the light into a magnetic recording device (as is set forth in greater detail below). By orienting the apertures at 90° to one another, the direction of the polarization thereof (whether linear or circular) may be different. The apertures 201 and 202 share the same multiple-layer mirror structure and bottom DBR mirror layer, such that the power of VCSEL 200 is twice the power of a similarly-sized VCSEL 200 with a single aperture. Apertures 201 and 202 share bonding pads 203 and 204, such that both apertures are on the same circuit. VCSEL 200 further includes alignment marks 205, which may be used to help align VCSEL 200 with another device to which it may be attached by, e.g., wafer-level bonding.

Figure 3:
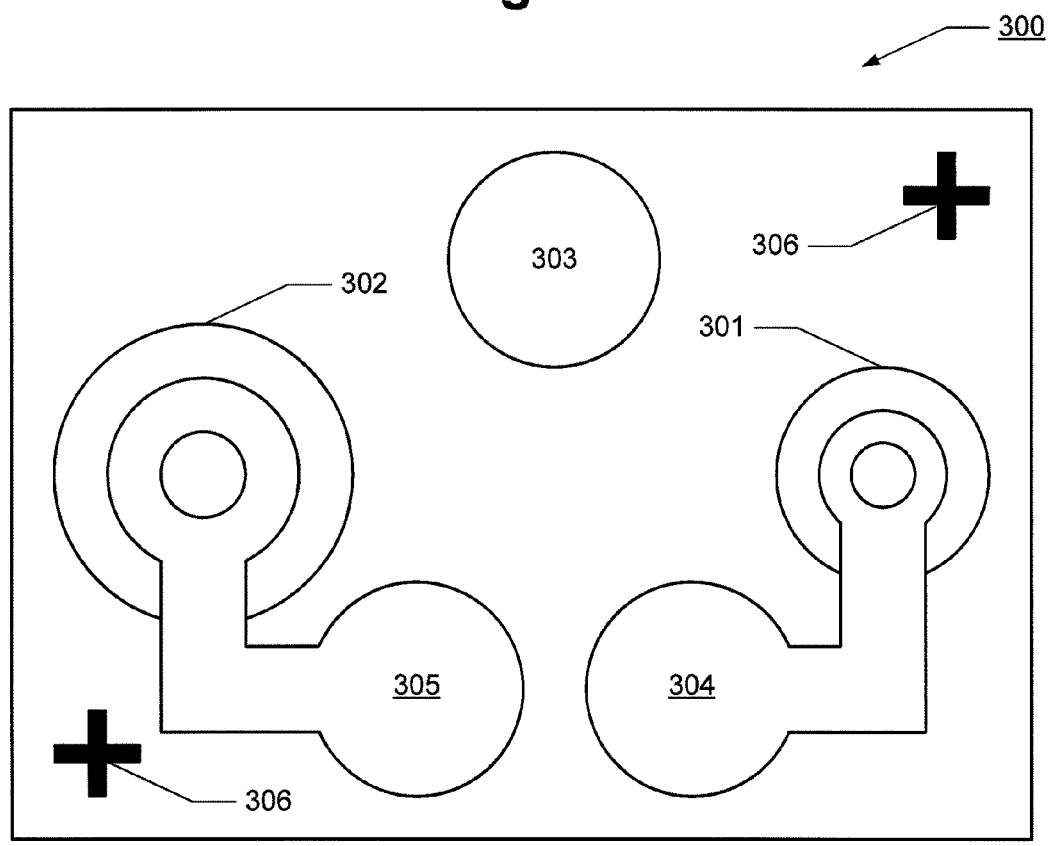
FIG. 3 illustrates a multiple aperture VCSEL in accordance with one aspect of the subject disclosure.

While in the foregoing exemplary embodiments, VCSELs with similarly-sized apertures have been illustrated, the scope of the present invention is not limited to this arrangement. For example, FIG. 3 illustrates an exemplary multi-aperture VCSEL in accordance with one aspect of the subject disclosure, in which apertures of differing sizes are used to provide different levels of power from the same VCSEL. In this regard, VCSEL 300 includes two similarly-shaped (e.g., circular) apertures 301 and 302. The apertures 301 and 302 share the same multiple-layer mirror structure and bottom DBR mirror layer. Aperture 301 is smaller than aperture 302, such that the power produced by aperture 301 is less than the power produced by aperture 302. Apertures 301 and 302 share an n-bonding pad 303 but are connected to separate p-bonding pads 304 and 305, respectively, such that each aperture is on a different circuit. This configuration may be used to separately switch apertures 301 and 302 to provide multiple levels of power (e.g., powering only aperture 301 for a lowest power level, powering only aperture 302 for a higher power level, and powering both aperture 301 and 302 for a highest power level). Different levels of power may be desirable based upon the operating temperature of the magnetic recording media to be written (e.g., when the temperature of the media is lower, more power may be used to locally heat a spot for writing than when the temperature of the media is higher).

As can be seen with reference to FIG. 3, VCSEL 300 further includes alignment marks 306, which may be used to help align VCSEL 300 with another device to which it may be attached by, e.g., wafer-level bonding.

As is illustrated with respect to FIG. 3, different apertures on a multiple aperture VCSEL may be located on different circuits (e.g., by connecting them to separate anodes, separate cathodes, or separate anodes and cathodes), in accordance with various aspects of the subject disclosure. Separately switching laser apertures on the same VCSEL allows for providing differing levels of power and for redundancy and/or yield (in the event one laser aperture is defective or malfunctions, additional laser apertures may be available). Configuring different apertures to share at least one bonding pad may simplify the fabrication of a VCSEL and its integration to passive light delivery waveguides.

While in the foregoing exemplary embodiments, multiple-aperture VCSELs with exactly two apertures each have been illustrated, the scope of the present invention is not limited to such an arrangement. Rather, VCSELs with any number of apertures greater than one may be utilized to provide varying levels of power to EAMR heads.

Figure 4:
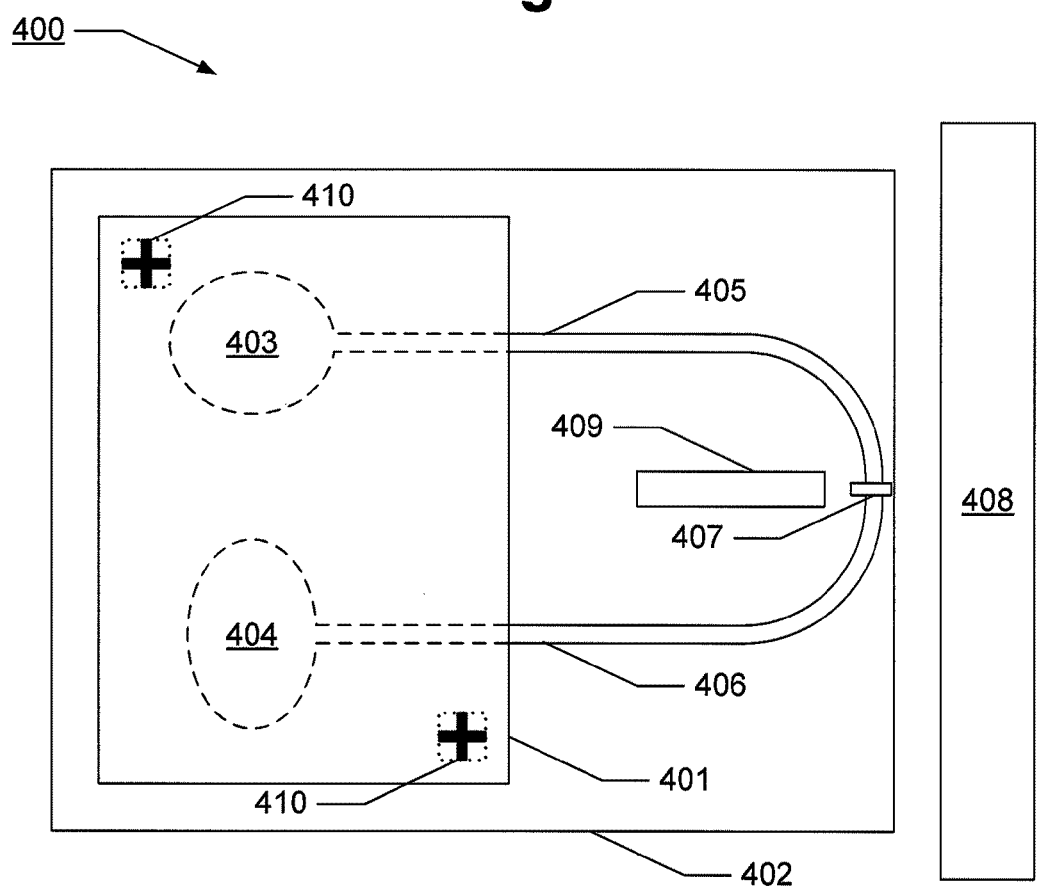
FIG. 4 illustrates a magnetic recording device in accordance with one aspect of the subject disclosure.

FIG. 4 illustrates a magnetic recording device comprising a multiple-aperture VCSEL in accordance with one aspect of the subject disclosure. Magnetic recording device 400 includes a multiple-aperture VCSEL 401 attached to a magnetic recording head 402. VCSEL 401 and magnetic recording head 402 include alignment marks 410, which are used to help align VCSEL 401 with magnetic recording head 402 during the attachment of VCSEL 401 to magnetic recording head 402. Apertures 403 and 404 of VCSEL 401 are coupled to waveguides 405 and 406, such that the laser light produced thereby is coupled into the magnetic recording head 402. The coupling of apertures 403 and 404 to waveguides 405 and 406 may be realized through any one of a number of methods known to those of skill in the art (e.g., grating assisted coupling or the like).

Waveguides 405 and 406 direct the laser light to a near field transducer (NFT) 407, which concentrates the energy thereof to a nano-sized spot on recording medium 408. This heated region experiences a lower magnetic coercivity, such that magnetic write pole 409 is able to change the magnetic orientation thereof in a write operation. NFT 407 may be disposed in a layer of magnetic recording head 402 between write pole 409 and a return pole. By configuring NFT 407 to be in resonance with and shared by both waveguides 405 and 406, the heating capability thereof may be doubled (when compared to an NFT illuminated by a single waveguide).

According to one aspect of the subject disclosure, aperture 403 and 404 may be configured to provide laser light of a preferred polarization (e.g., both apertures may be configured to provide a linearly polarized mode such that the light in the respective waveguide is in a TE or a TM mode). In this regard, NFT 407 may be configured to couple with either a TM or a TE mode of light from the VCSEL.

As can be seen with reference to FIG. 4, waveguides 405 and 406 are on opposite sides of write pole 409, such that write pole 409 does not interfere with the propagation of light in waveguides 405 and 406, and waveguides 405 and 406 do not adversely impact the write performance of write pole 409. According to one aspect of the subject disclosure, waveguides 405 and 406 may have the same path length, and may moreover taper towards NFT 407. Waveguides 405 and 406 are curvilinear, such that the ends of waveguides 405 and 406 that couple with the edges of NFT 407 are on opposite sides of NFT. This configuration allows NFT 407 to be designed such that the edges which couple with the ends of waveguides 405 and 406 are perpendicular to a direction of propagation of light in the waveguides, improving the coupling efficiency of the connection.

Figure 5:
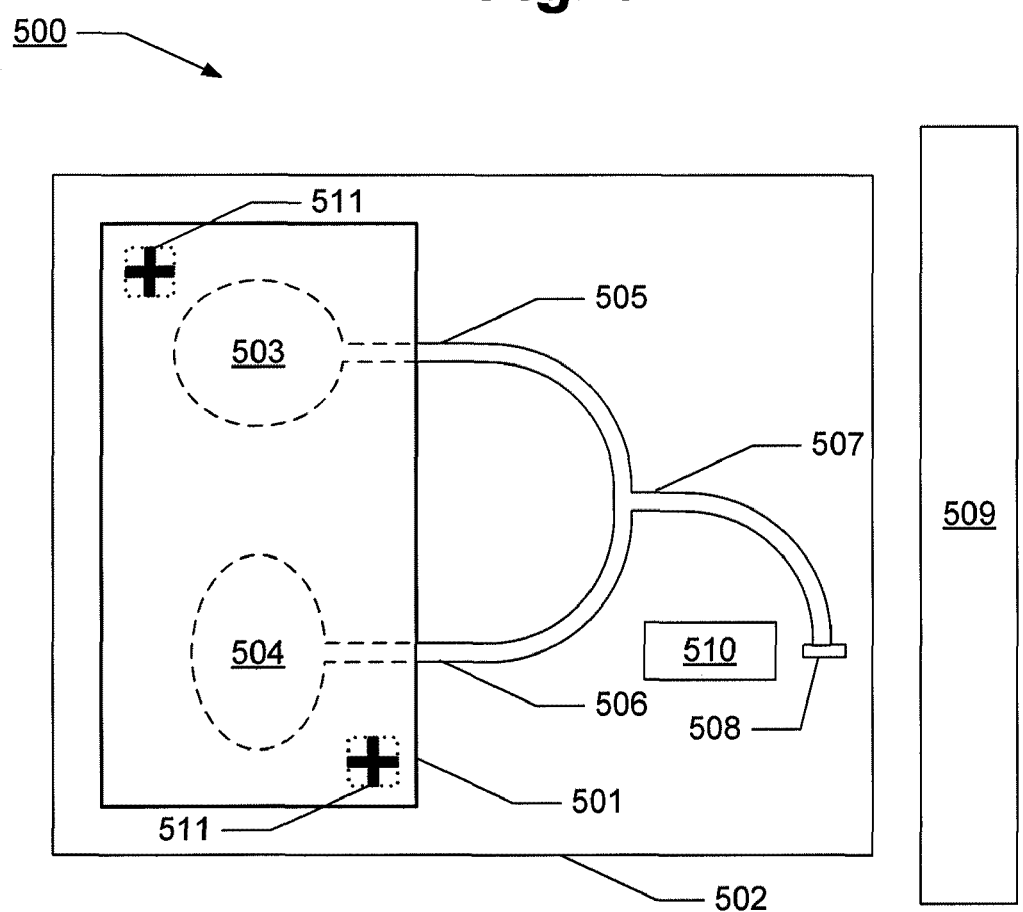
FIG. 5 illustrates a magnetic recording device in accordance with one aspect of the subject disclosure.

FIG. 5 illustrates a magnetic recording device comprising a multiple-aperture VCSEL in accordance with another aspect of the subject disclosure. Magnetic recording device 500 includes a multiple-aperture VCSEL 501 attached to a magnetic recording head 502. VCSEL 501 and magnetic recording head 502 include alignment marks 511, which are used to help align VCSEL 501 with magnetic recording head 502 during the attachment of VCSEL 501 to magnetic recording head 502. Apertures 503 and 504 of VCSEL 501 are coupled to waveguides 505 and 506, such that the laser light produced thereby is coupled into the magnetic recording head 502. The coupling of apertures 503 and 504 to waveguides 505 and 506 may be realized through any one of a number of methods known to those of skill in the art (e.g., grating assisted coupling or the like).

Waveguides 505 and 506 direct the laser light to another waveguide 507, where the light is combined before being delivered to a near field transducer (NFT) 508. NFT 508 concentrates the energy from waveguide 507 to a nano-sized spot on recording medium 509. This heated region experiences a lower magnetic coercivity, such that magnetic write pole 510 is able to change the magnetic orientation thereof in a write operation. NFT 508 may be disposed in a layer of magnetic recording head 502 between write pole 510 and a return pole.

As can be seen with reference to FIG. 5, waveguide 507 is located to one side of write pole 510, such that write pole 510 does not interfere with the propagation of light in waveguide 507, and waveguide 507 does not adversely impact the write performance of write pole 510. Nevertheless, as waveguide 507 is curvilinear, the end of waveguide 507 couples with an edge of NFT 508 which is approximately perpendicular to the air bearing surface of magnetic recording head 502. This configuration allows NFT 508 to be designed such that the edge which couples with the end of waveguide 507 is perpendicular to a direction of propagation of light in waveguide 507, improving the coupling efficiency of the connection.

Figure 6:
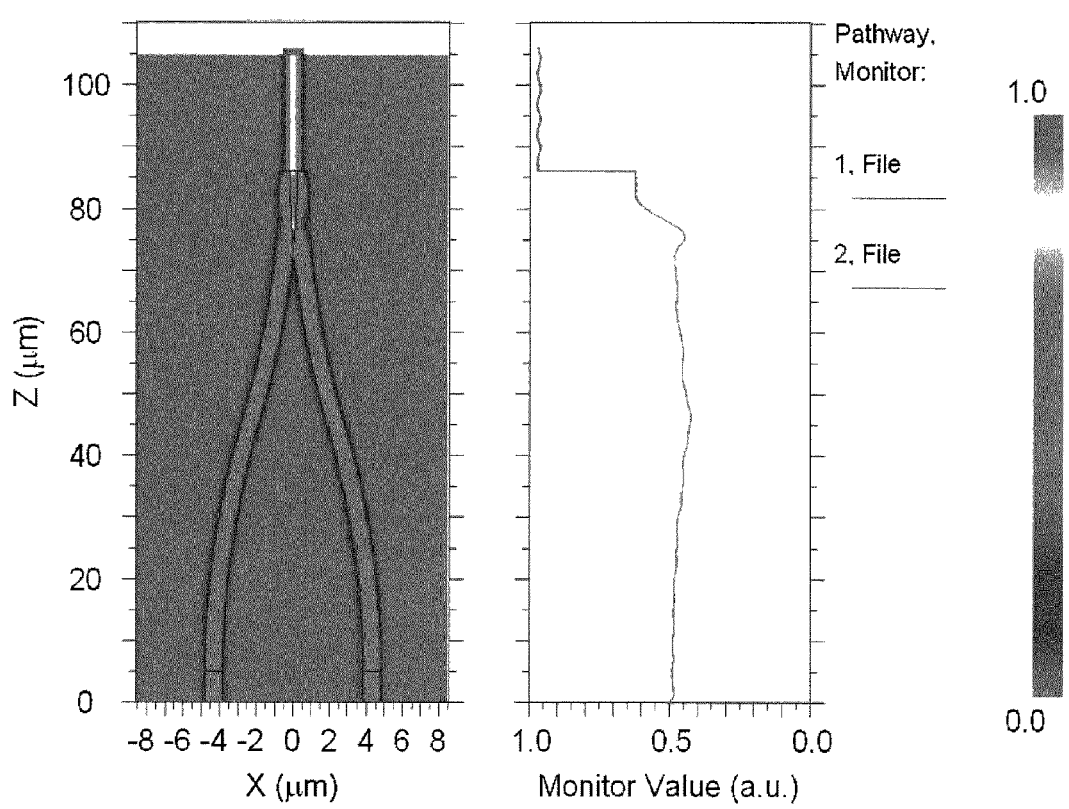
FIG. 6 is a graph illustrating the simulation results of a symmetric waveguide combiner, in accordance with one aspect of the subject disclosure.

FIG. 6 is a graph illustrating the simulation results of a symmetric waveguide combiner, such as is illustrated in FIG. 5, in accordance with one aspect of the subject disclosure. As can be seen with reference to FIG. 6, properly designed waveguide combiners can couple in-phase light with nearly no loss (e.g., 50% power in each individual waveguide leg is coupled to provide nearly 100% power). Thus, in those embodiments of the subject disclosure which rely upon a waveguide combiner to couple light originating from different apertures of a VCSEL before providing that light to a NFT, the efficiency of the combiner will detract very little from the efficiency of the overall light delivery system.

Various embodiments of the subject disclosure enjoy a number of benefits when compared with other EAMR systems and methods. By providing a VCSEL with multiple apertures, the optical power of a single VCSEL die can be increased without a corresponding increase in the wafer or process cost. By providing multiple apertures on a single circuit, a common electrical pad layout can be maintained for easy integration with an EAMR controller. When multiple waveguides are used to deliver light from the multiple aperture VCSEL to a NFT, interference with the performance of the magnetic write pole can be avoided. Biasing the shape and orientation of the apertures on the VCSEL allows for optimized optical coupling into the waveguides.

FIG. 7 is a flow chart illustrating a method of using a magnetic recording device in accordance with one aspect of the subject disclosure. The method begins with step 701, in which a plurality of waveguides disposed in a magnetic recording head are illuminated with a corresponding plurality of apertures of a multi-aperture VCSEL. Each of the plurality of waveguides has a second end coupled to a near field transducer of the magnetic recording head, whereby the near field transducer heats a region of magnetic recording media adjacent thereto. The method continues in step 702, in which a write pole of the magnetic recording head generates a magnetic field in the region of magnetic recording media to change a magnetic orientation thereof.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A magnetic recording device, comprising:
   a multi-aperture vertical cavity surface emitting laser (VCSEL) operably coupled to a magnetic recording head;
   a plurality of waveguides disposed in the magnetic recording head, each of the plurality of waveguides having a first end coupled to a different aperture of the multi-aperture VCSEL; and a near field transducer disposed in the magnetic recording head,
wherein each of the plurality of waveguides has a second end coupled to the near field transducer.

2. The magnetic recording device according to claim 1, wherein the multi-aperture VCSEL has two apertures.

3. The magnetic recording device according to claim 2, wherein each of the two apertures has a different size, shape and/or orientation.

4. The magnetic recording device according to claim 3, wherein each aperture is configured to provide laser light of a different polarization.

5. The magnetic recording device according to claim 1, wherein one aperture of the multi-aperture VCSEL is separately switched from another aperture of the multi-aperture VCSEL.

6. The magnetic recording device according to claim 1, wherein the magnetic recording head comprises a write pole, and wherein the plurality of waveguides include two waveguides on opposite sides of the write pole.

7. The magnetic recording device according to claim 6, wherein the two waveguides are curvilinear.

8. The magnetic recording device according to claim 1, wherein the plurality of waveguides all have a same path length.

9. The magnetic recording device according to claim 1, wherein the plurality of waveguides taper towards the near field transducer.

10. The magnetic recording device according to claim 1, wherein the magnetic recording head further comprises a write pole and a read pole, and wherein the near field transducer is disposed in a layer of the magnetic recording head between the write pole and the return pole.

11. The magnetic recording device according to claim 1, wherein the near field transducer has at least a plurality of edges corresponding to the plurality of second ends of the plurality of waveguides.

12. The magnetic recording device according to claim 11, wherein each of the plurality of edges is perpendicular to a propagation direction of the corresponding second end.

13. The magnetic recording device according to claim 1, wherein the near field transducer is coupled to at least two second ends on opposite sides of the near field transducer.

14. A method of using a magnetic recording device, comprising:
illuminating a plurality of waveguides disposed in a magnetic recording head with a corresponding plurality of apertures of a multi-aperture vertical cavity surface emitting laser (VCSEL), each of the plurality of waveguides having a second end coupled to a near field transducer of the magnetic recording head, whereby the near field transducer heats a region of magnetic recording media adjacent thereto; and
generating, with a write pole of the magnetic recording head, a magnetic field in the region of magnetic recording media to change a magnetic orientation thereof.

15. The method according to claim 14, wherein the multi-aperture VCSEL has two apertures.

16. The method according to claim 15, wherein each of the two apertures has a different size, shape and/or orientation.

17. The method according to claim 16, wherein each aperture is configured to provide laser light of a different polarization.

18. The method according to claim 14, wherein one aperture of the multi-aperture VCSEL is separately switched from another aperture of the multi-aperture VCSEL.

19. The method according to claim 18, wherein less than all of the plurality of apertures of the multi-aperture VCSEL are used when a temperature of the region of magnetic recording media is above a predetermined threshold.

20. The method according to claim 14, wherein the plurality of waveguides include two waveguides on opposite sides of the write pole.

21. The method according to claim 14, wherein the plurality of waveguides all have a same path length.

* * * * *